Figure 1:
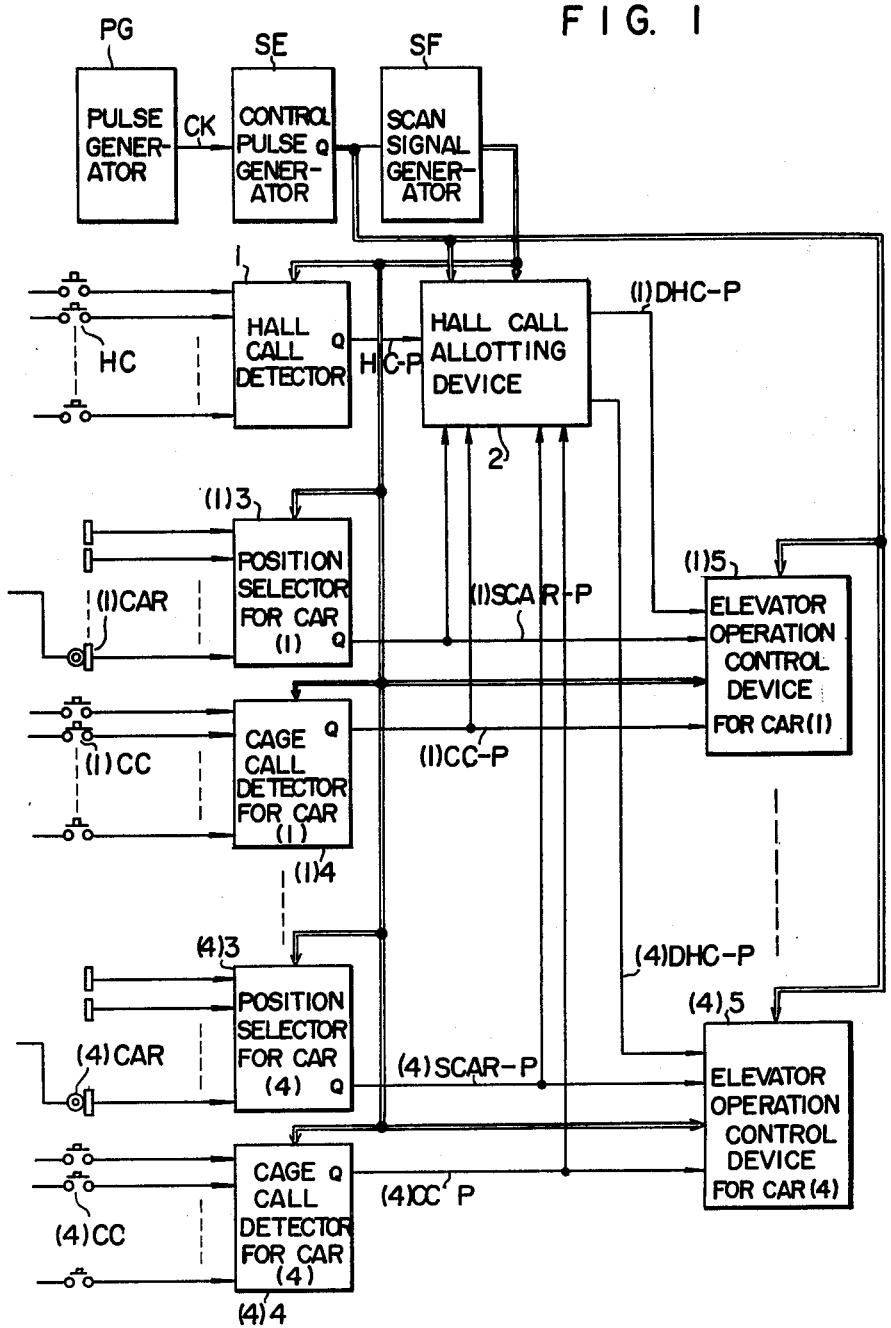

United States Patent [19]

Nakazato et al.

[11] 4,166,518

[45] Sep. 4, 1979

[54] ELEVATOR CONTROL SYSTEM

[75] Inventors: Masao Nakazato; Takeo Yuminaka; Kenji Yoneda, all of Katsuta, Japan

[73] Assignee: Hitachi, Ltd., Japan

[21] Appl. No.: 819,052

[22] Filed: Jul. 26, 1977

[30] Foreign Application Priority Data

Jul. 30, 1976 [JP] Japan ................................ 51-91459

[51] Int. Cl.² .............................................. B66B 1/18
[52] U.S. Cl. ................................................ 187/29 R
[58] Field of Search .......................................... 187/29

[56] References Cited
U.S. PATENT DOCUMENTS

| 3,511,342 | 5/1970 | Hall et al. | 187/29 |
| 3,739,880 | 6/1973 | Robaszkiewicz | 187/29 |
| 3,851,733 | 12/1974 | Sackin et al. | 187/29 |

Primary Examiner—J. V. Truhe
Assistant Examiner—W. E. Duncanson, Jr.
Attorney, Agent, or Firm—Craig and Antonelli

[57] ABSTRACT

A plurality of floors served by elevator cars are scanned by direction to detect car positions and hall calls. For each of the cars, a predetermined number is counted up for each scan slot after detection of a car position to determine the service load of each car to be borne before arrival at each floor. When a hall call is detected by scanning, a car with minimum service load in the related slot is selected and the hall call is allotted to that car. When the failure of a car to run to an end floor is predicted in counting the service load of the car, switch is made to count down in response to directional reversal when the scanning has reached the end floor. At the time of subsequent detection of an allotted hall call by scanning, switching is again made to count up, thus determining a proper service load of the cars.

11 Claims, 10 Drawing Figures

FIG. 8

| FLOOR | SF SLOT NO. | UP HALL CALL | CAR(1) | CAR(2) | CAR(3) | CAR(4) | DN HALL CALL | SF SLOT NO. |
|---|---|---|---|---|---|---|---|---|
| 14 | 16 | | | STOP ↓ | | | | 32 |
| 13 | 15 | | | | | | | 31 |
| 12 | 14 | | | | | | | 30 |
| 11 | 13 | | | | | | | 29 |
| 10 | 12 | | | | O | | | 28 |
| 9 | 11 | | | | | | | 27 |
| 8 | 10 | | | | | | | 26 |
| 7 | 9 | | | | | | | 25 |
| 6 | 8 | | | | ↑ RUN | | | 24 |
| 5 | 7 | | | | | | | 23 |
| 4 | 6 | | | | | | ▽ | 22 |
| 3 | 5 | | | | | | | 21 |
| 2 | 4 | | | | | | | 20 |
| 1 | 3 | | ↑ STOP | | | STOP | | 19 |
| B1 | 2 | | | | | | | 18 |
| B2 | 1 | | | | | | | 17 |

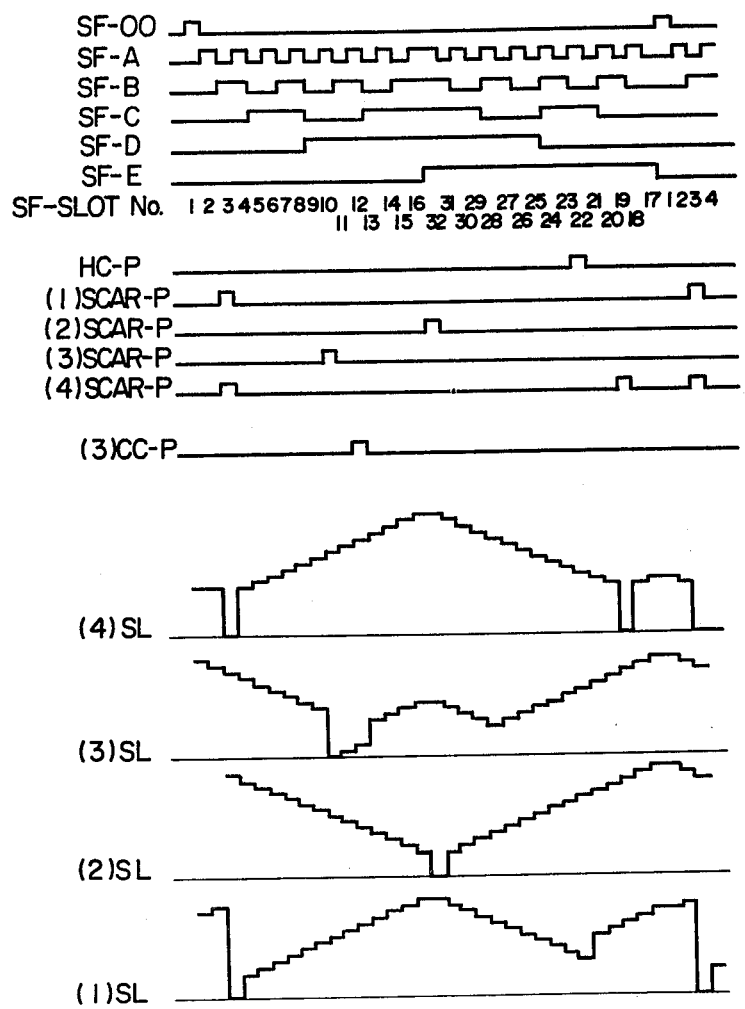

ELEVATOR CONTROL SYSTEM

LIST OF PRIOR ART REFERENCE (37 CFR 1.56 (a))

The following references are cited to show the state of the art:

U.S. patent application Ser. No. 737,170 filed Nov. 1, 1976 and entitled "Elevator Control System"

U.S. co-pending patent application Ser. No. 702,145, filed July 2, 1976 and entitled "An Elevator Control Apparatus Having a Novel Hall Call Allotting Device."

This present invention relates to a control apparatus for a plurality of elevator cars in juxtaposition, or more in particular to an improvement in an elevator control apparatus including a device for estimating the time required for each car to reach each floor.

In an elevator system comprising a plurality of elevator cars side by side, it is required to improve the service efficiency of the cars as a whole by controlling them in relation to each other. A method suggested for this purpose is by estimating the time for each car required to reach each floor. When a hall call is generated from a floor, for instance, an elevator car which is capable of reaching the floor earlier than the other cars is selected by use of the estimated time required to reach that floor. By causing the particular car to serve the particular hall call, the waiting time of prospective passengers at the floor is shortened. In addition, the estimated time can be utilized for various purposes of elevator control.

The estimated arrival time is not necessarily indicated by a signal accurately representing the time, but may be such as to enable comparison of magnitude. In other words, it may be a work load to be shared by each car before arrival at each floor. In this sense, a signal proportionate to the estimated time required before arrival at a floor may be called service load.

However, it should be noted that the time required for each car to reach a given floor in a direction away from the present car position and towards the given floor is different from the time required for the each car to reach the given floor in a direction opposite to the above direction, i.e. the direction towards the present car position. Thus, the service load for each car in the direction away from the present car position should be separated from the service load for the same car in the direction towards the present car position.

The inventors have suggested a system for determining such a service load, in a copending U.S. patent application Ser. No. 737,170 filed Nov. 1, 1976, entitled "Elevator Control System."

In the copending application, a plurality of floors served by elevator cars are sequentially scanned in upward and downward directions, alternately, to detect car positions, hall calls and cage calls. For each of the cars, a predetermined number is counted up for each scan slot subsequent to the detection of a car position to determine the service load to be shared by each car before its arrival at each floor by direction. In the process, the number to be counted up for each scan slot is changed dependent on the predicted operations to be done by the car. For example, the service load or the count-up number for running one floor space is "1," while, the count-up number for a stop at one floor is "7."

This suggested system has disadvantages in that it is difficult to determine a proper service load for a car whose travelling direction is not yet decided (such a car is called hereinafter as "a car having no directivity") or a car which is predicted to have no directivity. Assume, for instance, that when a car stands by at a floor without any directivity, a hall call toward the particular floor is generated at an adjacent floor. In this case, the scan is carried out along a path first towards an end floor and then returning to the floor generating the hall call, with the result that a service load much larger than the actual service load is erroneously estimated.

An object of the present invention is to provide an elevator control system comprising means which is always capable of estimating a proper arrival time.

According to the present invention, an elevator control system is arranged to include means for estimating a service load corresponding to the time required for each car to reach each floor in such a manner that when a given car has no directivity, the service load for each floor in a direction towards the car position is estimated in accordance with the spacial interval between the car position and each floor.

In the conventional system, the service load for each floor in the direction away from the car position is of course estimated in accordance with the spacial interval between the car position and each floor, while, the service load in the direction toward the car position is estimated by calculating the time required for the car, to travel upto an end floor, and then return to the particular floor. This system is advantageous where associated with control of the time-division mode in which service floors are scanned alternately in upward and downward directions.

According to the present invention, on the other hand, emphasis is placed on the fact that a given car lacking any directivity (or predicted to loss its directivity in the near future) is most likely in a position to serve any floor directly. On the basis of this principle, a service load is calculated in accordance with the spacial interval between the car position and a destination floor. This configuration permits a service load to be determined more accurately, which is utilized for determination of a car to serve a generated hall call by a hall call response control or for giving information on or indication of the waiting time or the earliest-arriving car.

Figure 2:
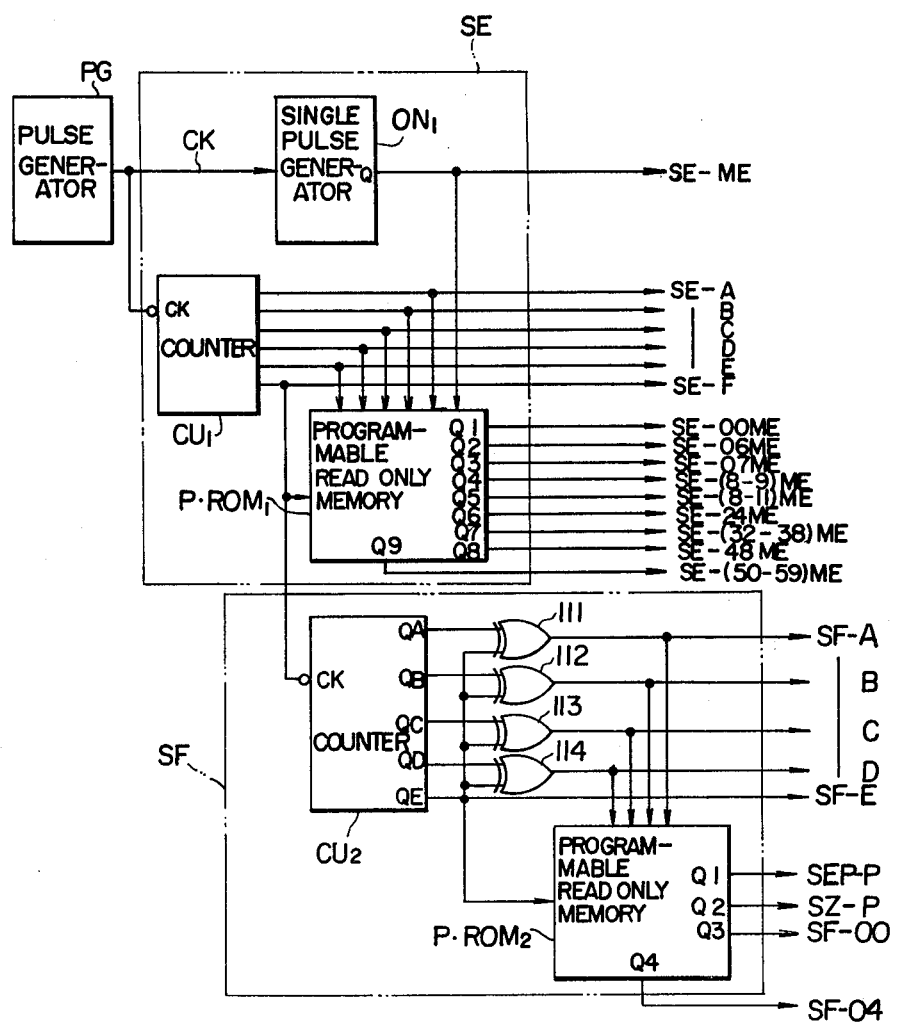
Figure 3A:
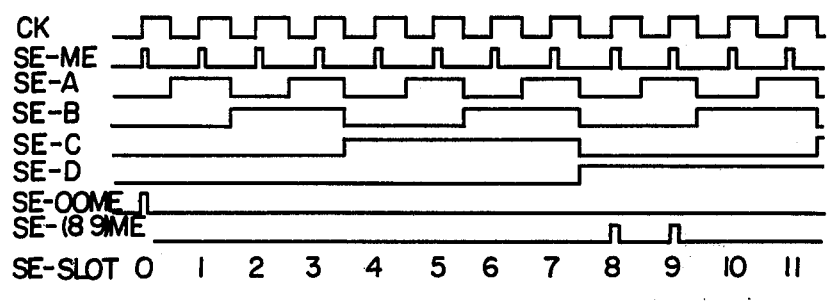
Figure 3B:
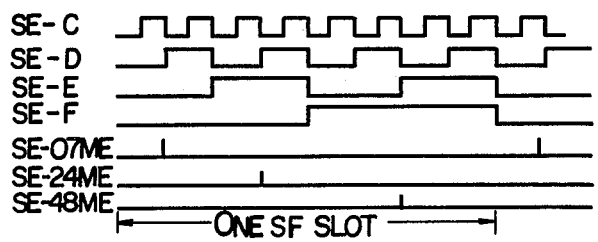
Figure 4:
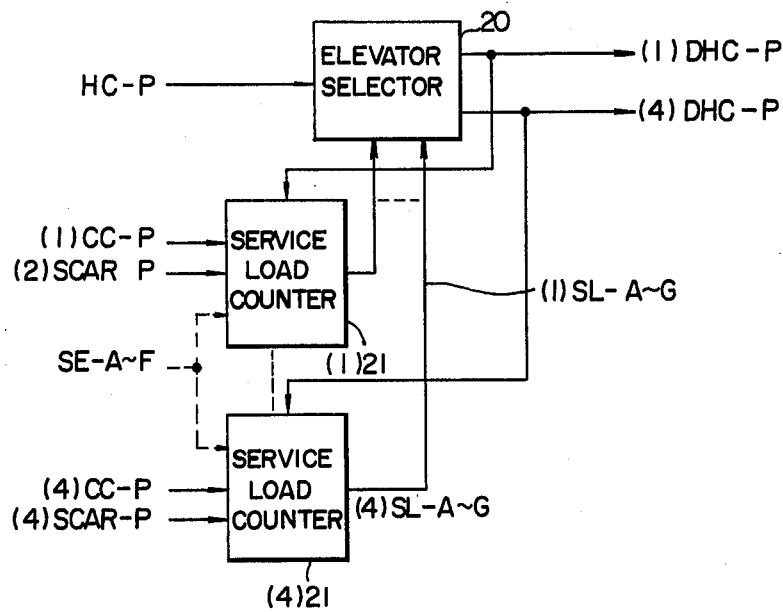
Figure 5:
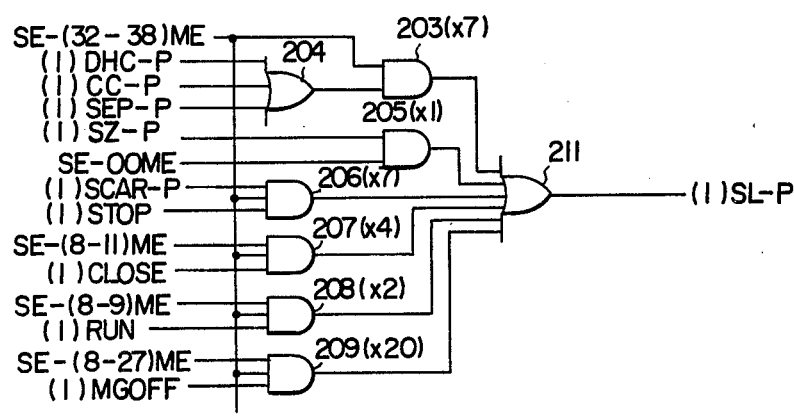
Figure 6:
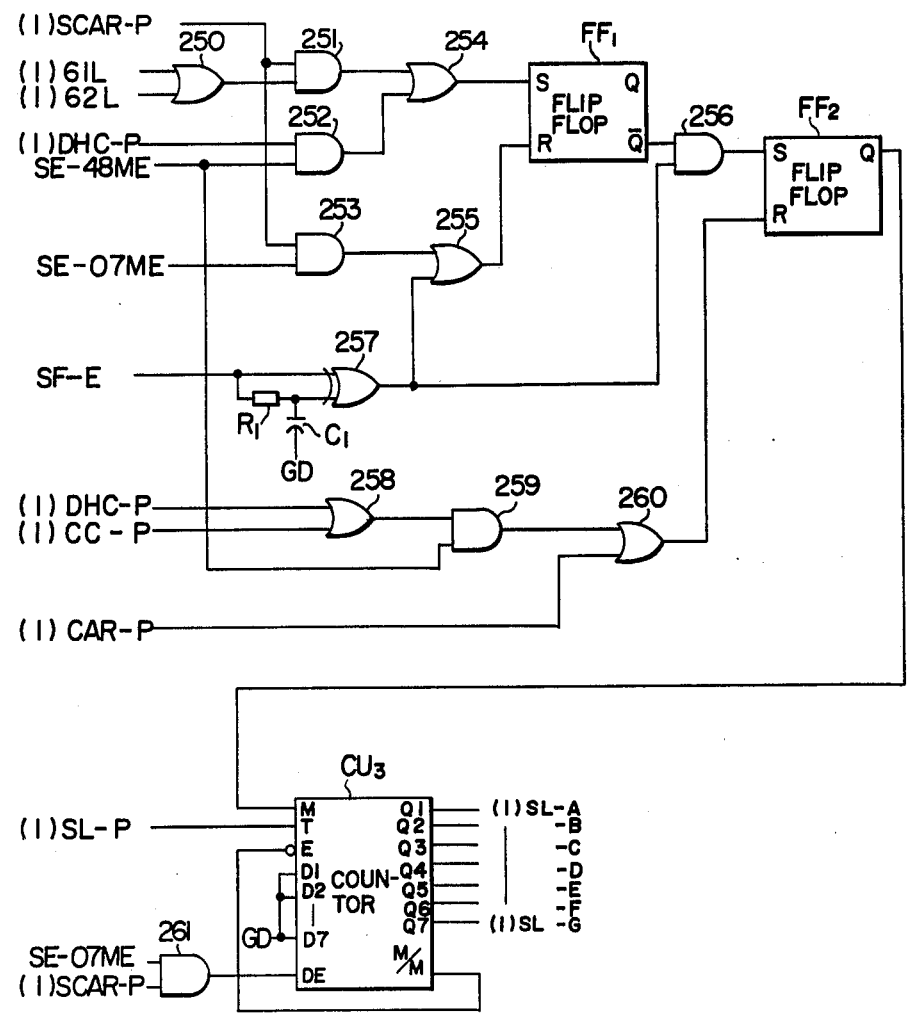
Figure 7:
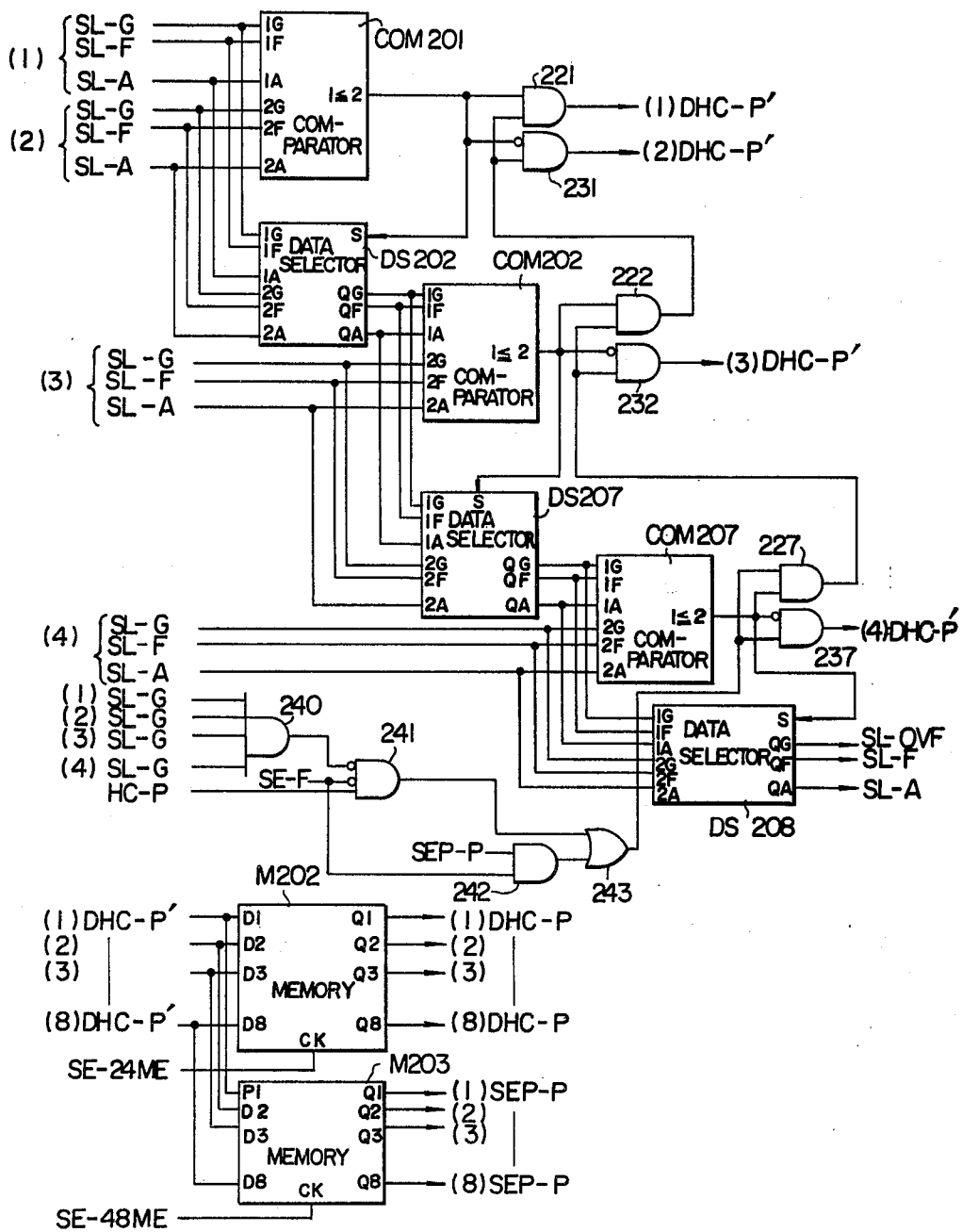

The other objects and features of the invention will become apparent when reading the following detailed description of embodiments in conjunction with the accompanying drawings in which:

FIG. 1 is a diagram showing a general configuration of an embodiment of the elevator control system according to the present invention, FIG. 2 is a diagram showing a specific construction of a control pulse generator SE and a scanning signal generator SF in FIG. 1, FIGS. 3A and 3B show signal waveforms for explaining the operation of the circuit of FIG. 2, using different time scales, FIG. 4 is a block diagram showing a hall call allotting device, FIG. 5 is a diagram showing a configuration of a pulse generator for counting the service load of car (1), FIG. 6 shows the construction of a service load generator, FIG. 7 is a diagram showing the construction of a device for selecting minimum service load and an associated elevator car, FIG. 8 show elevator car conditions for explaining the operation of the invention, and FIG. 9 is a time chart for explaining the operation of the apparatus according to the invention shown in FIG. 8.

The present invention will be described by using an embodiment applied to a control device for allotting hall calls to four cars in juxtaposition. A block diagram of such a device is shown in FIG. 1.

A pulse generator PG generates a clock pulse CK, which is frequency-divided by a control pulse generator SE and then applied to a scanning signal generator SF. From the control pulse generator SE, pulses SE-A–SE-F for timing the transmission and receipt of given signals in a time-division mode and operating pulses SE-OOME–SE-(50–59)ME for converting the number of floors to be passed or served by each car in response to calls into a signal indicative of required service time are applied to a hall call allotting device 2 and an elevator operation control device 5. From the scanning signal generator SF, scanning signals SF-A–SF-E for actuating the hall call allotting device in the time-division mode are generated and applied to a call detector 1 for detecting generated hall calls HC and applying them in the time-division mode, position selectors 3 for detecting and applying car positions CAR of the respective cars in the time-division mode, and cage call detectors 4 for detecting cage calls CC. The numerals (1) to (4) prefixed to respective reference numerals represent associated car numbers, the corresponding circuits concerning cars (2) and (3) being not shown.

Hall call detection pulse signals HC-P, car service position pulses SCAR-P and cage call detection pulses CC-P produced from the above-mentioned devices are applied to the hall call allotting device 2. The hall call detection pulse signal HC-P controls the scanned hall calls in such a manner as to allot them to one of the elevator operation control device 5 within each slot period of the scanning signal through the allotted hall call pulse DHC-P. If there is no elevator car which is expected with high probability to serve with minimum waiting time for a generated hall call or it the cars are in a generally congested situation, allotment is temporarily reserved or reallotment is made.

According to the construction of FIG. 1, the hall call detector 1, hall call allotting device 2, car position selectors 3 and cage call detectors 4 operate in synchronism with respective time slots of the scanning signal for processing the signals relating to the respective floors in the time-division mode and sequentially in the order of the scanning direction, so that the elevator operation control device 5 issues an up-travel order or down-travel order for operation control of each car. As a result, a compact and low-cost apparatus for controlling juxtaposed elevator cars is made possible without being substantially affected by the increase in the number of service floors.

Prior to specific explanation of the hall call allotting device 2, an embodiment of the control pulse generator SE and the scanning signal generator SF will be described with reference to the electrical circuit diagram of FIG. 2, and the time charts of FIGS. 3, 8 and 9.

Control binary signals SE-A to SE-F for dividing each the scanning signal SF-A–E into 64 equal parts are produced from the counter $CU_1$ by frequency-dividing the clock pulse CK produced from the pulse generator PG. One slot of the scanning signal is corresponding to one period of the timing pulse signal SE-F and allotted to one of the floors.

The clock pulses CK are applied to a single-pulse generator $ON_1$ to generate control pulses SE-ME each at the middle of one slot. This signal serves as a strobe pulse for timing of process of the concerned signals to be carried out exactly during the respective time slot. In other words, this prevents a trouble which otherwise might be caused by the delayed signal transmission at the time of switching of the control binary signals SE-A to SE-F.

The binary signals SE-A to SE-F and the control pulses SE-M are applied to a programmable read only memory $P \cdot ROM_1$, so that various control pulses are produced at the output terminals Q1 to Q9 in accordance with the preliminary stored programs.

The memory $P \cdot ROM_1$ is employed for the purpose of coping with the variations in traffic demand mode with the elevator rated running speed, average interfloor distance or applications of the building served. In such a case, the memory is reprogrammable without changing the circuit configuration of the hall call allotting device. This memory may be readily replaced by a suitable gate circuit.

The memory $P \cdot ROM_1$ is programmed to produce at Q1 control pulse SE-OOME, as shown in FIG. 3A, each being generated at the beginning of each slot of the scanning signal. Signal waveforms of FIGS. 3A and 3B are shown based on SE and SF slots, respectively and, the latter being shown in smaller time scale than the former.

Further, $P \cdot ROM_1$ is programmed to produce at Q4 control pulses SE-(8–9)ME, which are produced in the eighth and ninth SE slots, respectively, as shown in FIG. 3A. Thus, two pulses are generated for each slot of the scanning signal SF. Also, the $P \cdot ROM_1$ is programmed to produce at Q8 a control pulse SE-48ME, which, as shown in FIG. 3B, is generated in the latter half of each slot of the scanning signal SF.

Specific applications of these control pulses will be explained together with explanation of the remaining circuit hereinafter.

The binary scanning signals SF-A–SF-D are produced by subjecting the binary control signal SE-F to frequency division by a counter $CU_2$ and applying to a modifying circuit including exclusive OR gates EOR 611–114.

The binary scanning signal SF-E is also produced by the counter $CU_2$ and applied to the other inputs of the gates EOR.

The memory $P \cdot ROM_2$ receives these binary scanning signals and is programmed to produce from these signals dispersed floor-calling pulse SEP-P, service zone pulse SZ-P, the first pulse signal SF-00 produced at the first slot of the SF slot train in the floor scanning and the fourth pulse SF-04 at the fourth slot of the SF cycle.

In this embodiment, explanation will be made of the case in which four elevator cars serve a building having fourteen floors above the ground and two basements.

Any direction of any floor may be allotted to the respective slot of the scanning signal. The sequence of allotment, however, must be such that as shown in FIG. 8, upward and downward movements are alternated with each other periodically In FIG. 8, the upward direction of the second basement is allotted to the slot SF-1. If it is allotted to another slot, the circuit configuration remains unchanged.

Further, although the scanning signal generator SF of FIG. 2 is provided for up to sixteen floors, a maximum of sixty four floors may be controlled with the same apparatus only by adding two digits of the binary scanning signal.

In scanning, two different SF slots are alloted to each floor for separating the floor as scanned in the upward direction from that as scanned in the downward direction. To the end, the SF slots allotted to the respective floors in the upward and downward directions are identified by the SF slot numbers. In this embodiment, as shown in FIG. 8, the SF slot numbers 1, 2, 3, ... 16 are allotted to the lowest one to the highest one of the floors in that order for scanning in the upward direction, while the SF slot numbers 32, 31, ... 17 are allotted to these floors in the opposite order for scanning in the downward direction. The signals representing these SF slot numbers are produced by means of the E-ORs 111–114. However, the invention is not limited to this example. This has an object to identify each floor by a binary code including binary signals SE-A–SE-B, while discriminate the upward or downward direction by a binary signal SA-E, so that the service position selector 3 for each elevator car may be used in common for both upward and downward directions thereby simplifying construction.

Next, an embodiment of the hall call allotting device 2 will be described in detail with reference to FIGS. 4 to 7.

The block diagram of FIG. 4 shows the hall call allotting device 2 including a service load counting device 21 for each elevator car and an elevator selector 20 to which the output of the device 21 and a hall call detection signal HC-P are applied.

The service load counting device 21 is first reset by the service position pulse SCAR-P. After that, for each slot of the scanning signal (hereinafter referred to as "SF slot"), it counts sequentially a number of pulses corresponding to the service delay time depending on the service conditions of the elevator car such as the delay time for running to the concerned floor, or the delay time for deceleration, stoppage and acceleration in response to the cage call detection pulse CC-P or the allotted hall call pulse DHC-P, as will be described in detail hereinafter. The elevator car selector 20 selects a car having the minimum one of the output values SL-A to SL-G of the service load counters 21 in each SF slot, and operates to allot the hall call detection signal HC-P appearing in the one scanning period by the scanning signal SF to the selected elevator car. When the service load of any cars is more than a predetermined value, it is possible to suspend the allotment temporarily. In FIG. 4, the circuit elements associated with cars (2) and (3) are not shown.

The diagram of FIG. 5 shows a pulse generator which makes up part of the service load counter (1) 21 for car (1). Similar devices are required also for cars (2) to (4). The AND gates 203, 205 to 209 and OR gate 204 control the generation of a predetermined number of pulses for each SF slot in response to each service input signal. The OR gate 211 calculates a logical sum of the outputs of these gates and produces the service load pulses SL-P. The service load may be determined by counting the pulses SL-P as its detail is described later with reference to FIG. 6.

The number of pulses to be generated by each gate, which is shown in FIG. 5 by a suffix, for example, "x7" for the gate 203 is programmed in the memory P-ROM$_1$ in FIG. 2 and may be changed in timing and number itself freely.

The embodiment under consideration includes nine service input signals as mentioned below. But they are not limited to them. The use of the signals other than the service zone pulse SZ-P may be withheld at will. Further, the accuracy in estimation of the service load may be improved by introducing a signal indicating the case weight signal and/or a signal indicating the car running speed.

1. DHC-P: An allotted hall call pulse produced in a given slot of the time-division mode by the scanning signal.
2. CC-P: A cage call detection pulse produced in a given slot of the time-division mode by the scanning signal
3. SEP-P: An automatic end or dispersed floor call pulse produced in a given slot of the time-division mode by the scanning signal. (This pulse is used to locate a given car at a given floor for waiting there a hall call thereof when the demand for car service becomes very few.)
4. SZ-P: A service zone pulse produced in a given slot of the time-division mode by the scanning signal
5. SCAR-P: A service position pulse produced in a given slot of the time division mode by the scanning signal
6. STOP: An elevator stop signal
7. CLOSE: A start (door-close) command signal
8. RUN: An elevator running signal
9. MGOFF: The conditions under which an elevator car operation is suspended (there is no service call) or the suspended operation continues for a certain period of time In response to each of these input signals, the pulse generators of FIG. 5 generates pulses in the number predetermined depending on the situation represented by the input signal. For example, in response to the signal MGOFF which indicates that the elevator car operation is suspended with its motor generator stopped, twenty pulses (shown in the drawing in the form of (x 20)) are produced, since the time from the start of MG to service is so long. In response to a signal expecting one stop of the elevator car, on the other hand, seven pulses (x 7) are produced. If the car remains stopped with its door half or completely closed, four pulses (x 4) are generated. Further, for the running elevator car, two pulses are set for deceleration and one pulse for the coverage of one floor interval. As a result, the number of the output pulses (1) SL-P of the OR element 211 represents the time required for the car to reach the particular floor from a floor, corresponding to each SF slot of the floor scanning signal.

The diagram of FIG. 6 shows the remaining elements of the load counter 21 of FIG. 4, which make up a circuit for adding or subtracting the service load pulses SL-P for car (1). The service load pulses SL-P in FIG. 5 are applied to the terminal T of the up/down counter CU$_3$ in FIG. 6. When the terminal M of the counter CU$_3$ is "0" and "1" the pulses SL-P are added and subtracted respectively. Accordingly, subtraction and addition are carried out when the flip-flop FF$_2$ is set and reset respectively.

The conditions for subtraction will be explained below. Either when an elevator car is stopped without aby directivity or when there is no hall call already allotted to the car (1), the flip-flop FF$_1$ fails to be set. In other words, when the car has no directivity so that both the up direction signal (1) 61L and the down direction signal (1) 62L are "0", both the outputs of the OR gates 250 and 251 are "0". In addition, if there is no hall call allotted to the car (1), the signal (1) DHC-P fails to be generated, with the result that the output of the AND gate 252 is also "0." This leads to the "0" state of the output of the OR gate 254. The output $\overline{Q}$ of the flip-flop $FF_1$ remains "1". When the floor-scanning signal SF-E is converted from "1" to "0" or from "0" to "1," the signal at one of the input terminals of the E.OR gate 257 is generated in the form of pulse delayed by the resistor $R_1$ and the capacitor $C_1$. This pulse sets the flip-flop $FF_2$ through the AND gate 256.

In other words, the service load pulse is subtracted in the case where the car has no directivity, the floor-scanning signal for sequential directional scanning is switched from up to down direction or from down to up direction.

The subtraction of the service load is continued until the floor scanning reaches a floor where a cage call is generated, a floor with an allotted hall call, or in the absence of the former two, a floor where the car is currently staying. Thus, the cage call detection pulse (1) CC-P and the allotted hall call pulse (1) DHC-P resets the flip-flop $FF_2$ through the OR gate 258, AND gate 259 and OR gate 260, while the pulse signal (1)mCAR representing the current car position resets the flip-flop $FF_2$ through the OR gate 260.

The terminal DE of the counter $CU_3$ is impressed with the service position pulse (1) SCAR-P and the control pulse SE-07ME through the AND gate 261. When the floor-scanning returns to the service position of car (1) after making one round, the contents of the counter $CU_3$ is cancelled to zero with the timing of the control pulse SE-07ME.

The output at the terminal M/M is applied to the terminal E for the purpose of stopping the counts in case of overflow of the counter $CU_3$.

The result of counting the service load pulses is produced in the form of a binary number with seven digits at the output terminals $Q_1$ to $Q_7$ of the counter $CU_3$. If more detailed control is desired, another counter may be added for increased digits.

Next, the variations in the service loads SL-A to SL-G shown in FIG. 6 will be described in detail with reference to the embodiments of FIGS. 8 and 9.

First, explanation will be made of the variations in the service load (1) SL or car (1) (shown in FIG. 9). Car (1) stays at the first floor 1F with no destination but having upward directivity, and therefore the signal (1) STOP is in the "1" state in FIG. 5. (At the first floor which is a reference floor, one of the cars has always a definite directivity as a leading car.) The count made by the counter $CU_3$ of the service load counter (1) 21 changes in the following manner when the scanning advances from the slot SF-3 associated with the first floor in the upward scanning.

The counter $CU_3$ is cleared by the AND gate 261 (FIG. 6) at the timing when the service position pulse (1) SCAR-P is "1" and the control pulse SE-07ME is "1" in the slot SF-3. In FIG. 5, the AND gate 206 produces a logical product of the control pulse SE-(32-38)ME, the service position pulse (1) SCAR-P and the stop signal (1) STOP. The AND gate 206 thus generates seven pulses, which are applied through the OR gate 211, as the service load pulse (1) SL-P, to the counting terminal T (FIG. 6) for making counts.

In the process, the flip-flop $FF_2$ in FIG. 6 is not set and therefore the terminal M of the counter $CU_3$ is impressed with a "0" signal for count up. Thus, as shown in FIG. 9, the service load of car (1) (values indicated by (1) SL-A to (1) SL-G) takes the value corresponding to "7" after finishing the process at the slot SF-3.

When the SF slot changes from 3 to 4, the AND gate 205 shown in FIG. 5 receives the control pulse SE-OOME and the service zone pulse SZ-P and produces one service load pulse (1) SL-P, so that the value of the counter $CU_3$ increases from 7 to 8. In like manner, the value of the counter $CU_3$ rises from 8 to 9 in the slot SF-5, and to 10 in the slot SF-6. Subsequently, according as the floors are scanned upward from one floor to another, the service load is increased one by one. This condition is shown at the bottom of FIG. 9.

When the scanning is changed from the slot SF-16 to slot SF-32, a change in scanning direction causes a pulse signal to be produced from the E.OR gate in FIG. 6. Under the situation of FIG. 8, neither an up hall call at the 2nd to 13th floors nor a down hall call at the 14th floor is generated, and therefore there exists no hall call allotted to car (1) in the meantime. The allotted hall call pulse (1) DHC-P fails to be generated in any of the slots SF-4 to SF-16, so that the output of the AND gate 252 is maintained at "0". During this time, therefore, the flip-flop $FF_1$ is not set, and the output $\overline{Q}$ of the flip-flop $FF_1$ remains at "1".

When transfer is made from slot SF-16 to SF-32 after the scanning has reached the top floor 14F, generation of a pulse signal by the E.OR gate 257 causes the output of the AND gate 256 to change to "1", thus setting the flip-flop $FF_2$. As a result, the signal applied to the terminal M of the counter $CU_3$ becomes "1", so that the direction of counting of the up-down counter $CU_3$ is switched to down counts.

With subsequent progress of the scanning, the service load of the car (1), as shown at the bottom of FIG. 9, is reduced one by one.

When the car is not destined to come to the end floor, the service load beyond the end floor is reduced, so that the service load up to a floor beyond the end floor (in the direction toward the current car position) is indicated by the value equivalent to the physical intervals between the floor and the car position. As a result, the service load of all the cars (1) to (4) with no allotted hall call is reduced after the scanning has been changed from SF-16 to SF-32.

Also, after the scanning is changed from SF-17 to SF-1 slot at the lowest floor B2, the service loads (2) SL to (4) SL of cars (2) to (4) without any allotted hall call change to decrease. The service load (1) SL or car (1), however, is not changed to decrease at that time point. The reason is that the 4th-floor down hall call (marked with ∇) in FIG. 8 is allotted to car (1) by the elevator selector in FIG. 7 as described later. It is obvious from FIG. 8 that the 4th-floor down hall call is served most promptly if allotted to car (1) which has upward directivity but no destination. This is realized by selecting a car with the smallest service load as described above. Comparison between the service loads of the cars in the slot SF-22 associated with the 4th-floor down travel shows that, as clear from FIG. 9, the service load (1) SL of car (1) is the smallest. Thus the particular hall call is allotted to car (1). The allotted hall call pulse (1) DHC-P is generated in FIG. 6, with the result that the AND gates 252 and 259 produce "1" signals with the generation of the 48th control pulse SE-48ME in the SF-22 slot. The flip-flop FF$_2$ is reset and the service load counter is changed in direction upwardly, while at the same time setting the flip-flop FF$_1$. For this reason, even if the output of the gate E.OR257 becomes "1" when the scanning signal reaches the end floor, the AND gate 256 is kept "0". Thus the flip-flop FF$_2$ fails to be set, so that the counter CU$_3$ is maintained at up counts.

In other words, car (1), by being allotted with the 4th-floor down hall call, must serve the hall call. The service load is then increased by 7 in the slot SF-22. In addition, since the passengers who will take the car at the fourth floor are possibly may come down to the lowest floor, it is estimated that car (1) will turn after reaching the lowest floor.

The count operation of the counter CU$_3$ is rechanged from count down to count up not only at the time of allotment of a hall call but also in the presence of a cage call CC-P of the associated car position signal CAR-P.

FIG. 7 shows a specific configuration of the elevator car selector 20 of FIG. 4 which makes up a part of the hall call allotting device 2 in FIG. 1.

First, the magnitudes of service loads of cars (1) and (2) are compared by the comparator COM$_{201}$. Based on the result of the comparison, the data selector DS$_{202}$ picks up the smaller one of the service loads, which is then compared with the service load of car (3) at the comparator COM$_{202}$. The data selector DS$_{207}$ selects and produces the smallest one of the service loads of cars (1) to (3). This selected smallest value is compared with the service load of the car (4) by the comparator COM$_{207}$, and when the data selector DS$_{208}$ picks up the smallest one of the service loads of all the cars.

The operation of the circuit of FIG. 7 will be described below specifically with reference to the slot SF-22 of the time chart shown in FIG. 9.

The service load of the car (1) is smaller than that of car (2), so that the comparator COM$_{201}$ produces "1". The AND gate 231 is prohibited, while at the same time applying a "1" signal to the selection terminal S of the data selector DS$_{202}$ for selecting the data on car (1).

Next, the service load of car (3) is larger than that of car (1). So, the comparator COM$_{202}$ produces a "1" signal, while the data selector DS$_{207}$ produces the service load of car (1). As a result, the comparator COM$_{207}$ compares the service load of car (1) with that of car (4). Since the former is smaller at the slot SF-22 in FIG. 9, the comparator COM$_{207}$ produces a "1" signal.

In the case where there exists a 4th-floor down hall call to be processed at the slot SF-22 as shown in FIG. 8, the hall call detection pulse signal HC-P is "1" (FIG. 9) and applied to the AND gate 221 via the AND gates 241, 227 and 222. The comparator COM$_{201}$ produces "1", with the result that this hall call is allotted to car (1) in response to the output signal (1) DHC-P′ of the AND gate 221.

Next, the memory M$_{202}$ reads and stores the output (1) DHC-P′ of the AND gate 221 in response to the 24th control pulse SE-24ME in the slot SF-22. This output signal is applied to the elevator operation control device (1) 5 of car (1) (FIG. 1) in the form of hall call pulse (1) DHC-P.

The result is that car (1) which is in a position to serve the 4th-floor down hall call (marked with ∇ in FIG. 8) earliest among the cars is used to serve the hall call.

Further, the signal DHC-P′ may be used for indication of the car allotted with the hall call HC-P at the floor landing concerned.

If the pulse SF-A is used in place of the hall call pulse HC-P to be applied to the AND gate 241 of FIG. 7, it is of course possible to determine a car which is capable of serving any desired floor the earliest and estimate its arrival time independently of the presence or absence of a hall call from the floor. Such information may be displayed beforehand on the floor landing.

In this embodiment, it is obvious that after a car has served a hall call of a certain floor requesting travel in the same direction of its running and then the hall call has been reset, it is preferable to delay the switching of the counting operation of the system to the subtraction mode by a proper period of time sufficient to register a new cage call in the same direction which may be resulted from the service of the hall call.

It will be understood from the foregoing description that the apparatus according to the invention, in order to predict the service load of a car without any directivity, comprises means for calculating the physical interval between a destination floor and the present position of the car, thus realizing an elevator control system with means for forecasting a proper service load.

What is claimed is:

1. An elevator control system for controlling an elevator system including a plurality of elevator cars for serving a plurality of floors, said control system comprising:
    hall call means provided on each floor for producing separately up and down hall calls indicative of calling for upward and downward travel services, respectively, from said each floor;
    service load estimating means provided for each car to estimate service loads indicative of time intervals which will be required for said each car to reach respective positions where said each car can respond to the hall calls derived from the respective floors, and
    means for selecting one of said cars to be allotted to each hall call on the basis of such service loads estimated for said each hall call by the estimating means of the respective cars,
    said service load estimating means comprising:
        end floor estimating means for estimating whether said each car will maintain its predetermined travelling direction unit it reaches an end floor or not;
        means for estimating such a service load for each hall call on the basis of a distance-dependent value, which is a function of a spatial distance measured from an instant position of said each car to its service position where said each car can respond to said each hall call along a path proceeding from said instant position to said end floor and then returning towards said instant position;
        first means for determining said distance-dependent value so that when the estimation of said end floor estimating means is "yes" the value is progressively increased with the increasing of said spatial distance, and
        second means for determining said distance-dependent value so that when the estimation of said end floor estimating means is "no" the value is progressively increased with the increasing of said spatial distance in a first range of said path up to said end floor and then progressively decreased with the increasing of said spatial distance in a second range of said path exceeding said end floor.

2. An elevator control system according to claim 1, wherein said service load estimating means further comprises third means for causing said second means to again progressively increase said distance-dependent value, if said each car is designated to stop at a floor in said second range of the path with increasing of said spatial distance in a third range of the path exceeding said last-mentioned floor.

3. An elevator control system according to claim 1, wherein said service load estimating means further comprises third means for causing said second means to again progressively increase said distance-dependent value with increasing of said spatial distance in a third range of the path exceeding said instant position.

4. An elevator control system according to claim 1, wherein said end floor estimating means is responsive to the presence or absence of a hall call calling for travel towards said end floor and derived from a floor in said first range of the path.

5. An elevator control system for controlling an elevator system including a plurality of elevator cars for serving a plurality of floors, said control system comprising:
hall call means provided on each floor for producing separately up and down hall calls indicative of calling for upward and downward travel services, respectively, from said each floor;
service load estimating means provided for each car to estimate service loads indicative of time intervals which will be required for said each car to reach respective positions where said each car can respond to the hall calls derived from the respective floors; and
means for selecting one of said cars to be allotted to each hall call on the basis of such service loads estimated for said each hall call by the estimating means of the respective cars,
said service load estimating means comprising:
means for estimating whether said each car will take a return path from an intermediate floor before an end floor after leaving its instant position for travelling towards said end floor,
means for calculating the sum of a physical distance between said instant position and said intermediate floor and a physical distance between said intermediate floor and each floor located in said return path, and
means for estimating such a service load for a hall call derived from said each floor on the basis of said calculated sum of the physical distances.

6. An elevator control system for controlling an elevator system including a plurality of elevator cars for serving a plurality of floors, said control system comprising:
hall call means provided on each floor for producing separately up and down hall calls indicative of calling for upward and downward travel services, respectively, from said each floor;
service load estimating means provided for each car to estimate service loads indicative of time intervals which will be required for said each car to reach respective positions where said each car can respond to the hall calls derived from the respective floors; and
means for selecting one of said cars to be allotted to each hall call on the basis of such service loads estimated for said each hall call by the estimating means of the respective cars,
said service load estimating means comprising:
means for scanning said floors in upward and downward directions, alternately,
means for detecting the position of said each car and the position of each hall call with respect to respective scanning slots each corresponding to one scanned floor,
counter means capable of counting up and counting down, selectively,
means for resetting the content of said counter to zero at a scanning slot where said each car is detected and thereafter causing said counter to count up by a predetermined number at each of the succeeding scanning slots,
means for changing the operation of said counter from counting up to counting down at a scanning slot corresponding to an end floor if no hall call is detected by scanning from said each car detected scanning slot to said end floor scanning slot, and
means for estimating such a service load for each hall call on the basis of the content of said counter existing at a scanning slot where said hall call is detected.

7. An elevator control system according to claim 6, wherein said service load estimating means further comprises means for detecting the position of a car stop floor where said each car is to be stopped with respect to said scanning slots, and means for changing the operation of said counter from counting down to counting up at a scanning slot where such a car stop floor is detected.

8. An elevator control system according to claim 6, wherein said service load estimating means further comprises means for changing the operation of said counter from counting down to counting up at a scanning slot where said each car is detected.

9. An elevator control system according to claim 6, wherein said service load estimating means further comprises means for determining a specific number to be counted up by said counter at each scanning slot depending on a time interval for which said each car will stop at the floor corresponding to said each scanning slot before leaving said floor.

10. An elevator control system according to claim 6, wherein said selecting means comprises means for comparing the estimated service loads estimated by said service load estimating means of the respective cars with each other at a scanning slot where a hall call is detected and means for selecting one of the cars to be allotted to said hall call on the basis of the result of said comparison.

11. An elevator control system according to claim 10, wherein said selecting means includes means for selecting a car which has a smallest one of said estimated service loads.

* * * * *